United States Patent [19]

Ford

[11] Patent Number: 4,474,173
[45] Date of Patent: Oct. 2, 1984

[54] SOLAR ENERGY COLLECTOR

[75] Inventor: Richard G. Ford, Memphis, Tenn.

[73] Assignee: Energy Design Corporation, Memphis, Tenn.

[21] Appl. No.: 467,458

[22] Filed: Feb. 17, 1983

[51] Int. Cl.³ .............................................. F24J 3/02
[52] U.S. Cl. ............................ 126/450; 126/438; 126/443; 126/448; 165/95; 165/174
[58] Field of Search ............... 126/438, 442, 443, 448, 126/450; 165/95, 173, 174, 175, 176, 178

[56] References Cited

U.S. PATENT DOCUMENTS

| | | | |
|---|---|---|---|
| 3,227,153 | 1/1966 | Godel et al. | 126/271 |
| 3,893,507 | 7/1975 | MacCracken et al. | 165/175 X |
| 4,002,499 | 1/1977 | Winston | 136/206 |
| 4,043,318 | 8/1977 | Pel | 126/271 |
| 4,098,331 | 7/1978 | Ford et al. | 165/174 X |
| 4,105,042 | 8/1978 | Johnston | 165/95 X |
| 4,134,388 | 1/1979 | Kersten | 126/270 |
| 4,134,391 | 1/1979 | Mahdjuri et al. | 126/271 |
| 4,212,293 | 7/1980 | Nugent | 126/450 |
| 4,232,544 | 11/1980 | Frissora | 126/420 |
| 4,240,692 | 12/1980 | Winston | 350/96 |
| 4,269,172 | 5/1981 | Parker et al. | 126/448 X |
| 4,299,203 | 11/1981 | Skopp | 126/443 |
| 4,303,059 | 12/1981 | Ford | 126/438 |

OTHER PUBLICATIONS

Article from "Journal of Engineering for Power", Jul. 1965 issue, entitled Solar Energy Collection with Evacuated Tubes.

Primary Examiner—Margaret A. Focarino
Attorney, Agent, or Firm—Luedeka & Neely

[57] ABSTRACT

The specification discloses a solar energy collector having a manifold with a manifold supply tube and a manifold return tube disposed therein. Fluid is supplied to the apparatus through the manifold supply tube and is received from the apparatus through the manifold return tube. A plurality of spaced apart riser U-tubes extend away and upwardly from the manifold with one end of the U-tube being in fluid communication with the manifold supply tube and the other end of the U-tube being in fluid communication with the manifold return tube. Dimples are formed in spaced apart positions along the supply tube and an orifice is formed in the center of the dimple. The U-tube is connected to the supply tube at the dimple, covering the orifice so that the orifice meters the fluid flow to the U-tube. A solar energy absorber tube encompasses each of the U-tubes.

17 Claims, 7 Drawing Figures

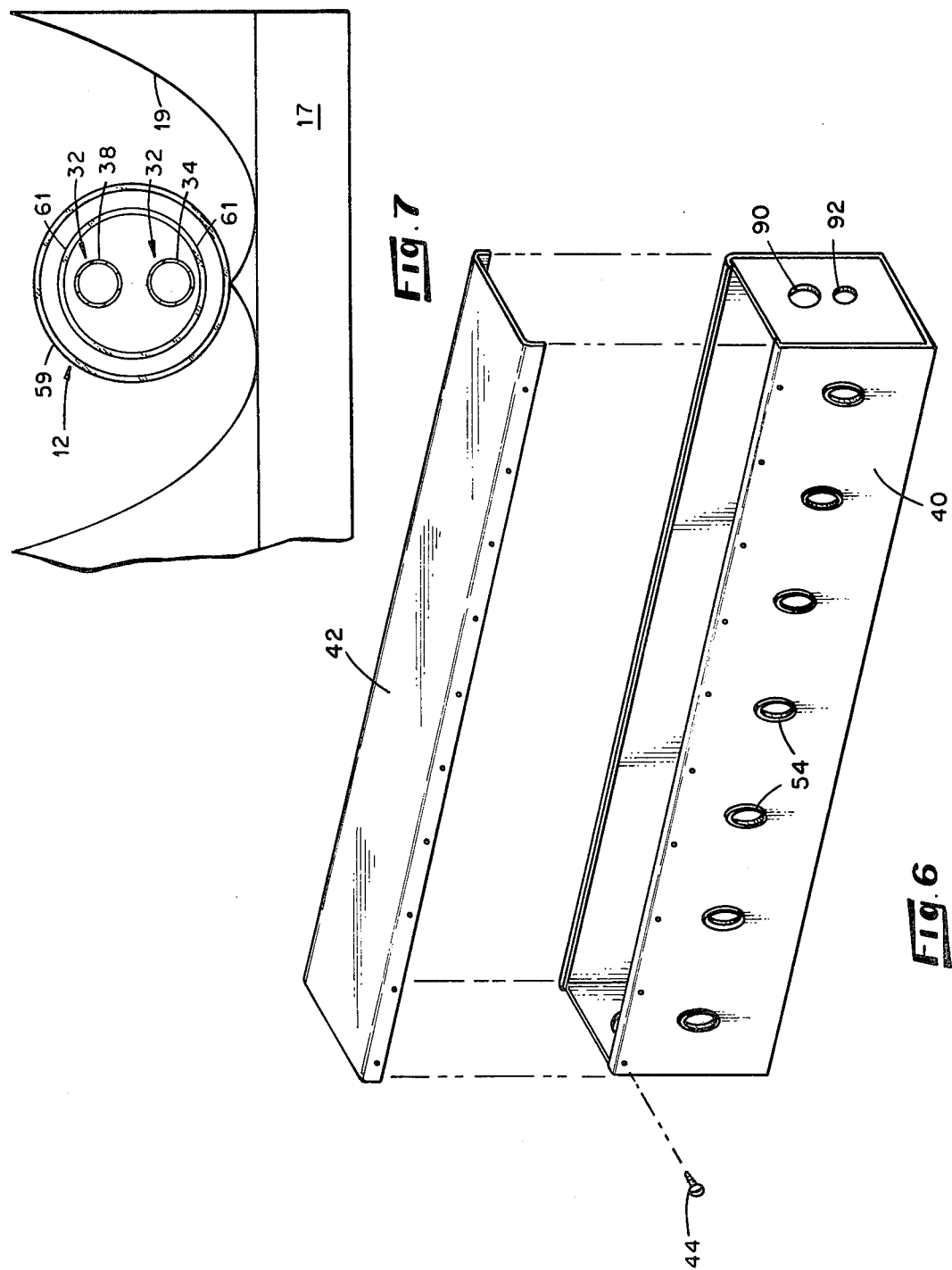

SOLAR ENERGY COLLECTOR

The present invention relates to solar energy collectors and, in particular, relates to a vacuum tube receiver solar energy collector having a plurality of U-shaped riser U-tubes with a balanced fluid flow in the riser U-tubes and automatic venting.

An effective type of solar energy collector utilizes a solar energy receiver tube which has a wavelength selective radiation absorbing and emitting coating which is insulated by a vacuum, to collect solar energy radiation and to suppress heat losses therefrom. In one type of device, the evacuated tube is of the "thermos bottle" type and is formed by two concentric nested tubes with a vacuum drawn in the annular space formed between the two tubes. The outer tube is glass and is left transparent and the inner tube is metal or glass and usually has a solar absorbing coating on its outer surface. The heat removal element of the collector is located within the innermost absorber tube and extracts heat from within that tube. In evacuated tube type solar collectors, solar energy is additionally sometimes concentrated or focused on the absorber tube, thus providing additional energy input.

Because of the features of vacuum insulation, wavelength selective absorber coatings and concentration, a vacuum tube type of solar collector has considerably enhanced efficiency in comparison to many other types of solar collectors such as the common flat plate collector. Consequently, the absorber element can experience high temperatures and wide temperature fluctuations. It is therefore most important that the heat removal elements of this type of solar collector operate properly in order to avoid the possibility of overheating which can be quite damaging.

In the solar energy collector of the present invention, fluid is circulated through metal tubing that is disposed, in part, within the evacuated receiver tubes, and in many applications it is desirable to use untreated water as the fluid circulated through the collector. Thus, proper provision must be made for draining the collector during periods of non-use, such as at night, to insure against freezing the water that would remain in the tubing if it were not drained, which would cause tube rupture. In order to assure full and proper drainage, it is essential to vent the fluid tubing at its uppermost location, to break any vacuum therein which would inhibit or prevent drainage. Typically, this venting has been accomplished by mechanical devices such as vacuum-relief valves or third pipe installations, both of which are generally not desirable because of the cost and/or of their propensity for failure. The present invention provides a static venting system that is incorporated in the overall design of the fluid circulating system and which is highly reliable in venting the system to allow full and proper drainage.

Another frequent source of failure in a fluid circulation system of a solar energy collector is clogging in the fluid tubing due to minerals or other contaminants in the fluid or due to chemical processes such as oxidation of the fluid tubing itself. Clogging is most likely to occur in the narrowest passages and such passages are often difficult to access for cleaning in a typical solar energy collector. In the present invention, the fluid circulation system incorporates features to provide access to likely clogging areas and to facilitate cleaning operations.

In accordance with the present invention, an apparatus for collecting solar energy and for heating a fluid supplied from an external fluid source for use in an external device includes a manifold disposed at the lower end of the apparatus. A manifold supply tube forms a part of the manifold and is operable to receive fluid for the apparatus from the external fluid source. A manifold return tube also forms a part of the manifold and is operable to return fluid from the apparatus for use in the external device. A plurality of spaced apart riser U-tubes extend away from the manifold in an upwardly inclined direction, and each of the riser U-tubes includes a supply end, a supply side extending from the supply end, a U-joint in the U-tube disposed on the supply side of the tube distally from the supply end, a return side extending from the U-joint toward the manifold, and a return end on the return side of the U-tube. The supply end of the riser U-tubes is in fluid communication with the supply tube, while the return end is in fluid communication with the return tube. An orifice is formed within each of the U-tubes between the supply end and the U-joint, and has a substantially reduced area with respect to the cross-sectional area of the U-tube. The orifices function to control the flow of fluid in each U-tube so that fluid will fill the supply side of the U-tube but is of insufficient flow volume to completely fill the return side of the U-tube and so will partially fill and gravity flow through the return side of the U-tube into the manifold return tube. The orifices further function to substantially meter the flow of fluid in each of the riser U-tubes so as to equalize the flow of fluid in each one. A plurality of vacuum tube receiver tubes are provided, with each of such vacuum tube receiver tubes encompassing one of the riser U-tubes for substantially capturing the solar radiation and containing that heat energy around the riser U-tubes to allow the working fluid to extract the heat therefrom and transport it away.

It will be appreciated that the design of the riser U-tubes and the orifices is such that the return side of the U-tubes and the manifold return tube function to vent air. The orifices allow the supply side of the U-tubes to fill with pumped fluid and since the U-joints are above the supply end of the U-tubes, the entire supply side will be completely filled with fluid. However, once the fluid passes the U-joints, it gravity flows back down the return side of the U-tubes because the flow volume is always insufficient to fill the return side of the U-tubes due to the restricted flow rate caused by the orifices. That is, the fluid trickles down the sides of the return side of the U-tubes, and a column of air or an air vent space is left in both the return side of each of the U-tubes and also the manifold return tube. When the apparatus is not in use, and fluid is not being supplied via a pump to the apparatus through the supply tube, the fluid may drain back through the supply side of the U-tubes and the supply tube due to the venting accomplished through the manifold return tube and the return side of the U-tubes. If such venting were not present, water would be trapped in the supply side of the U-tubes even when the manifold supply tube was drained, due to the resultant partial vacuum.

In accordance with another aspect of the present invention, a plurality of circular dimples are formed at spaced positions along the manifold supply tube and protruding into the manifold supply tube. Each of the dimples includes one of the orifices formed at the approximate center and apex of the dimple, and the dimple has a diameter preferably at least as great as the diameter of the supply end of the supply riser U-tubes. The supply end of the supply riser U-tube is attached to the manifold supply tube, preferably, by welding the supply end of the supply riser U-tube in the dimple over the orifice. A fluid containment device is detachably sealably attached to one of the manifold supply tube and is removable from the supply tube to provide access to the interior thereof. A cleaning access is formed in the manifold for providing access to the fluid containment device and the supply tube for a cleaning operation.

The dimple structure in the manifold supply tube as described above is particularly suited to a cleaning operation. The most likely place for clogging to occur in the fluid circulation system of the above described apparatus is the orifice formed in the dimple since it is a small passageway compared to the tubing. To clean minerals or other debris from the orifices, the fluid containment device is removed, and a wire brush or the like may be reamed through the supply tube. Since the dimples protrude into the interior of the manifold supply tube, the orifices are disposed at innermost positions in the supply tube and the wire brush engages a throat at every dimple. Thus, the cleaning action of the brush is enhanced as it passes by a dimple and the orifice is efficiently cleaned. Also, due to the concave structure of the dimple, its inward sloping walls enable complete fluid drainage out of the supply riser U-tubes, without any restriction.

Further advantages, and problems overcome by the present invention, will become apparent through reference to the following Detailed Description of the invention when considered in conjunction with the accompanying drawings in which:

FIG. 6 is an exploded view of the manifold housing; and

FIG. 7 is a cross-sectional view of the riser U-tubes, the evacuated tube receiver and the reflector.

Figure 1:
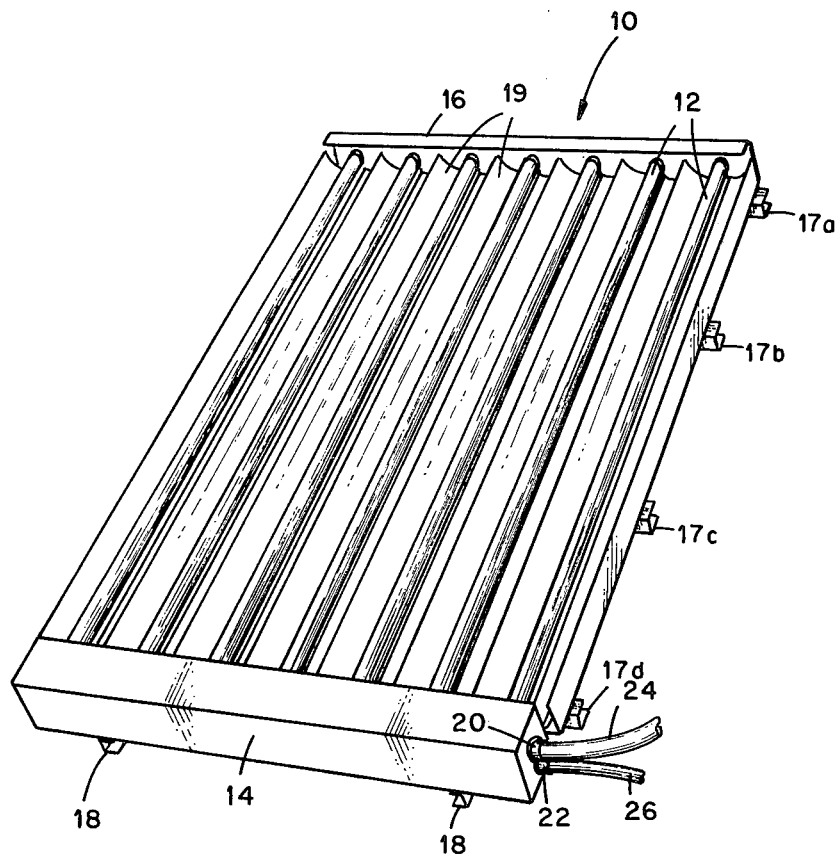
FIG. 1 is a perspective view of an evacuated tube receiver solar energy collector.

Referring now to the drawings in which like reference characters designate like or corresponding parts throughout the several views, there is shown in FIG. 1 a perspective view of an evacuated tube solar receiver type solar energy collector 10 embodying the present invention. The collector 10 utilizes a plurality of evacuated solar radiation receiver tubes 12 which serve as insulated solar energy absorber elements. The open ends of the solar vacuum tubes 12 are mounted in a manifold 14 and the opposite sealed ends of the tubes 12 are mounted on lateral rail 17a. Located behind the solar vacuum tube receivers are reflector elements 19 which are mounted on lateral rails 17a, 17b, 17c and 17d. The solar vacuum tubes 12, manifold 14, reflectors 19 and four lateral rails 17a, 17b, 17c and 17d are mounted on a pair of longitudinal rails 18 which are adapted for mounting the collector 10 on a roof or a similar inclined structure or frame.

A manifold return tube 20 and a manifold supply tube 22 are shown extending from the end of the manifold 14, and rubber hoses or similar devices 24 and 26 are sealably attached by conventional means to the ends of the tubes 20 and 22, respectively. Fluid, such as water, is supplied to the solar energy collector 10 through the hose 26 and supply tube 22 and, after the fluid has been heated in the collector 10, it is returned for use in an external device through the return tube 20 and hose 24.

The tubes 20 and 22 also extend out of the opposite end of the manifold 14 which is not shown in FIG. 1. If desired, several collectors 10 may be interconnected by interconnecting their respective manifold supply tubes 22 and manifold return tubes 20 using the hoses 26 and 24.

Figure 2:
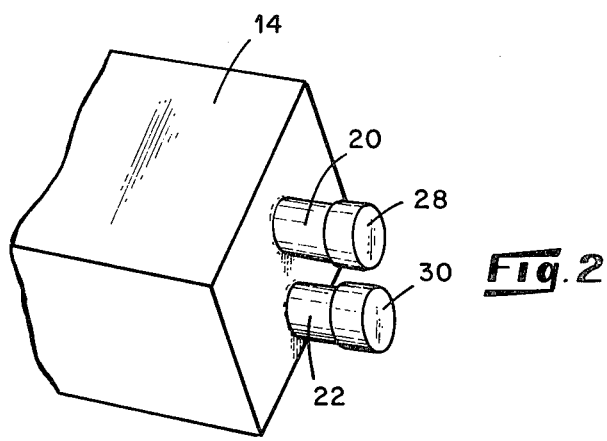
FIG. 2 is a broken away view of one manifold end showing caps on the supply and return tubes extending therefrom.

In FIG. 2, there is shown another view of one end of the manifold 14 in which caps 28 and 30 are shown sealably and removably mounted on the ends of the return tube 20 and the supply tube 22, respectively. Such caps 28 and 30 are conventional in nature and may be threaded on the ends of the tubes or may be metalurgically attached thereto. By removing caps 28 and 30, access may be gained to the interior of the tubes 20 and 22 for a cleaning operation.

Figure 3:
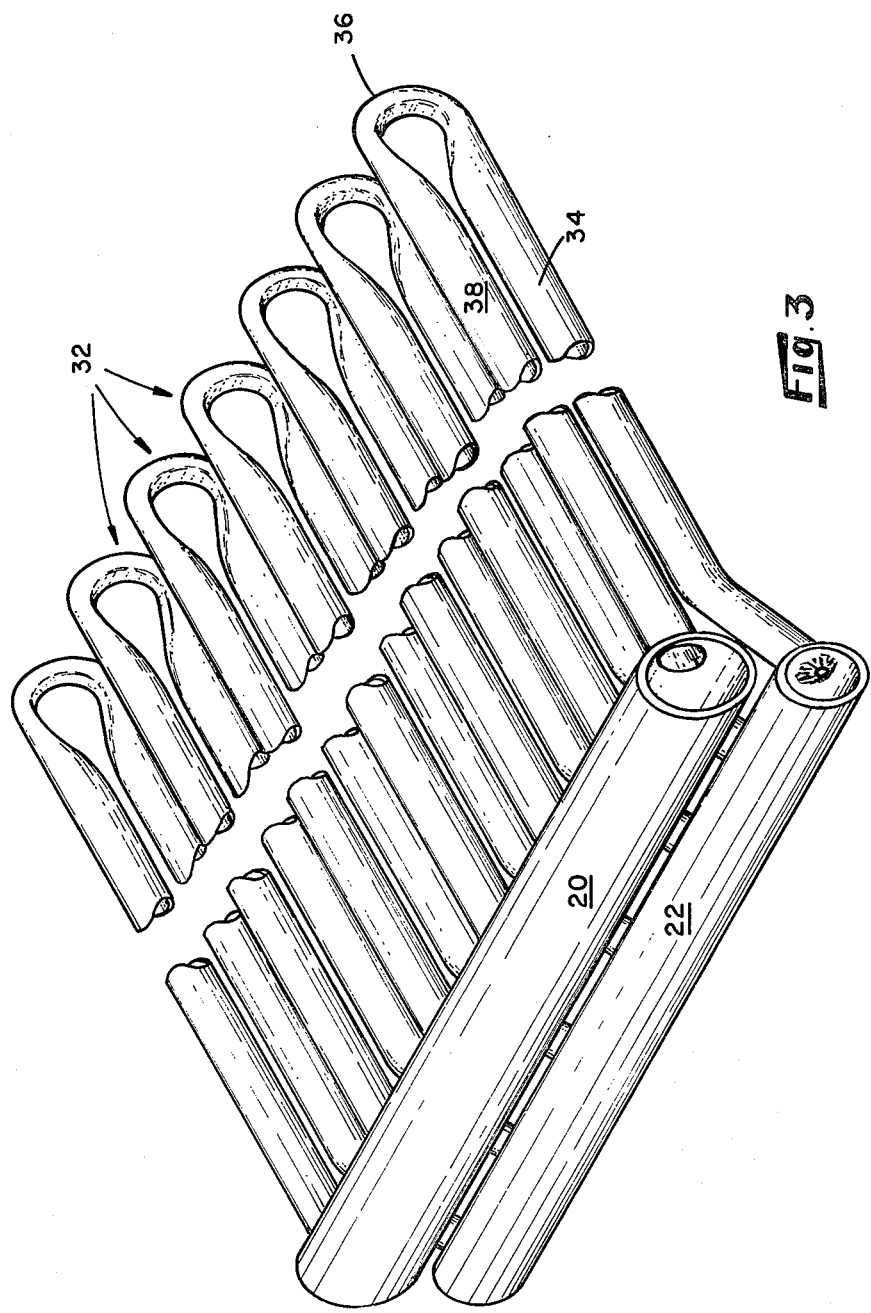
FIG. 3 is a broken away perspective view of the riser U-tubes used as heat extracting elements in the solar collector of the present invention.

Referring now to FIG. 3, there is shown a perspective view of the manifold supply tube 22, manifold return tube 20, and a plurality of riser U-tubes 32. The riser U-tubes 32 are constructed of one-half inch outside diameter metal tubing such as stainless steel tubing and are preferably painted flat black. One end of the U-tube 32 is welded to and in fluid communication with the manifold supply tube 22 and the other end of the U-tube 32 is welded to and in fluid communication with the return tube 20. The manifold tubes 20 and 22 are also constructed of a metal such as stainless steel with the supply tube 22 having an outside diameter of one inch and the return tube 20 having an outside diameter of 1.250 inches.

The evacuated receiver tubes 12 and the riser U-tubes 32 serve respectively as solar radiation absorbing and heat transferring elements for the collector 10. A fluid, such as water, is introduced into the collector 10 through the manifold supply tube 22. The fluid is transmitted from the supply tube 22 to a supply end of the riser U-tubes 32. The fluid fills the supply side 34 of each U-tube 32 and partially fills the U-bend 36. In operation, the riser U-tubes 32 are always oriented in an upwardly inclined position so that the U-bends 36 are elevated above both of the ends of the U-tubes 32 and above the manifold tubes 20 and 22. The fluid flowing into the supply side 34 of the riser U-tubes 32 is controlled or metered via the orifices so that when the fluid reaches the uppermost position in the U-bends 36 it will gravity feed and trickle down the return sides 38 of the U-tubes 32, leaving an air column or vent space in those return sides. The fluid also gravity feeds through the manifold return tube 20 leaving an air column or vent space that communicates with the vent spaces in the return sides 38 of the riser U-tubes 32. In a normal operation, the manifold return tube 20 will be connected so as to return the hot water to a reservoir of hot water which is used in an external device such as a heating unit. The fluid conduit between the reservoir and manifold return tube 20 will be installed with a slope such that it will allow gravity return of the hot water back to the reservoir and sized so as to allow venting between the reservoir and the manifold return tube 20. Thus, a complete vent is established between the reservoir, the return tube 20 and the return side 38 of the U-tubes 32, so that a vacuum in the fluid system positively cannot exist.

Fluid is pumped to the supply tube 22 from an external fluid source, such as a reservoir, that is designed to gravity feed or syphon in a reverse direction when the fluid is not being mechanically pumped to manifold supply tube 22. That is, the external fluid source will either supply pressurized fluid to the manifold supply tube 22, or it will allow reverse drainage of that tube. However, in order to properly drain the U-tubes 32, it is necessary that the supply sides 34 of the tubes 32 be vented to allow reverse fluid flow due to gravity, without the impedence of a vacuum condition. This venting is automatically accomplished by the previously described vent space that is established in the return sides 38 of the U-tubes 34 and in the return tube 20. Thus, when a system employing the collector 10 of the present invention is turned off or is not in operation, it will automatically reliably gravity drain all fluid from the system into the reservoir. This aspect of the present invention is important in that it allows the use of fluids, such as water, that would freeze during periods of non-use of the collector if the fluid were not allowed to drain.

Figure 4:
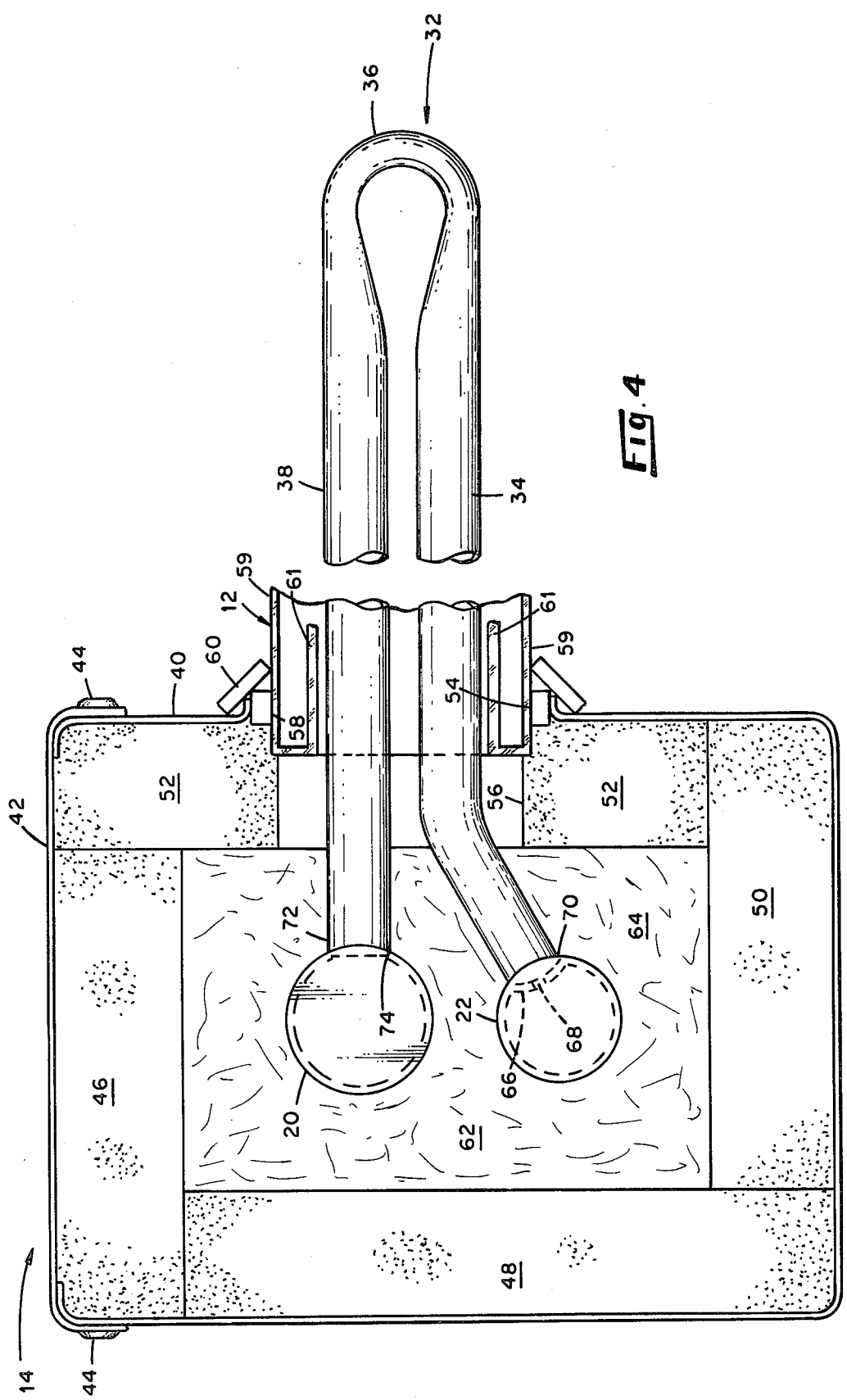
FIG. 4 is a broken away cross-sectional view of the manifold with housing, one riser U-tube, and an evacuated tube solar energy receiver.

In FIG. 4, there is shown a cross-sectional view of the manifold 14 and the U-tubes 32. In this view, the construction of the manifold 14 is shown in detail. Manifold 14 includes a manifold housing 40 that is typically constructed of sheet aluminum having a thickness of 0.04 inches. The manifold 14 is generally rectangular in construction and includes a manifold cover 42 that is secured to the manifold housing 40 by sheet metal screws 44. Isocyanurate foam insulation boards 46, 48, 50 and 52 are mounted on the four lateral interior walls of the manifold housing 40 to provide insulation and, in the preferred embodiment, have a thickness of one inch. Outwardly flared apertures 54, one of which is shown in FIG. 4, are formed in the side of the manifold 14 to receive the open end of the evacuated solar receiver tube 12. Likewise, apertures 56 are formed in the insulation board 52 in a position aligned with the aperture 54. A rubber mounting ring 58 constructed of high temperature elastomeric material such as silicone rubber is mounted in the aperture 54 for providing a sealed mount between aperture 54 and the evacuated solar receiver tube 12. A rubber skirt 60 is mounted on the exterior of the evacuated tube and extends over the outwardly flared sides of aperture 54 to provide additional weather sealing between the vacuum tube 12 and the manifold 14.

In this view, it may be appreciated that the solar energy receiver tube 12 is constructed of an exterior tube 59 and an interior tube 61. The exterior tube 59 is constructed of transparent glass for transmitting solar energy radiation therethrough. The interior tube 61 is also preferably constructed of glass, and is coated with a solar energy absorbing material so that the interior tube 61 absorbs the solar energy transmitted through the exterior tube 59. The annular space between the two tubes 59 and 61 is evacuated to insulate the interior absorber tube 61 from heat losses to the outside air.

Referring, again, to the manifold 14, a cavity 62 is formed in the interior center of the manifold 14 between the insulation boards 46, 48, 50 and 52. The cavity 62 is generally rectangular in shape and extends for the length of the manifold 14. Fibrous insulation such as fiberglass insulation 64 is provided to further insulate the cavity 62, and to buffer the foam insulation board from the detrimental effects of the high temperatures of the tubing.

The manifold supply tube 22 and the manifold return tube 20 are mounted in the approximate center of the cavity 62 and again extend through the length of the manifold 14 as previously described with reference to FIG. 1. A plurality of dimples 66 are formed at spaced intervals along the supply tube 22 and protrude into that tube. The diameter of the dimple 66 is preferably equal to or greater than the diameter of the supply U-tubing 34, and an orifice 68 is formed in the center apex of the dimple 66. In the preferred embodiment, the diameter of the orifice 68 is fifty thousandths (0.050) of an inch and the diameter of the dimple 66 is equal to or greater than one-half (0.5) inch. Thus, the dimple 66 is dimensioned to receive the supply end 70 of the U-tube 32. The dimple 66 performs three functions. It presents a flat annular surface that will mate with the end of the tubing 32 so that the supply end 70 of the riser U-tube 32 is simply abutted against the dimple and preferably welded thereto to form the attachment therebetween. Also, the dimple 66 disposes the orifice 68 inwardly from the cylindrical surface of the supply tube 22. This inward positioning of the orifice 68 exposes it to efficient cleaning action. For example, if a cylindrical wire brush is forced down the manifold supply tube 22, the brush will encounter a throat at every dimple 66. Thus, the brush will be compressed and will have an increased cleaning action at the apex of the dimple 66 where the orifice 68 is located. In this manner, the cleaning of the orifices 68 is enhanced. Finally, due to the inwardly sloping walls of the dimple 66, full drainage of fluid from the riser U-tube 32 is achieved.

A plurality of apertures 74, one of which is shown in FIG. 4, are formed in spaced positions along the manifold return tube 20. Aperture 74 is dimensioned to snugly receive the return end 72 of the U-tube 32, and return end 72 is inserted through the aperture for a distance approximately 0.125 inches and is preferably welded to the return tube 20. In this manner, the return end 72 of the U-tube 32 is placed in fluid communication with the return tube 20.

The U-bend 36, in the preferred embodiment, is simply a bend in the tube 32. It will be appreciated by reference to FIG. 4 that the bend in the tube 32 reduces the cross-sectional area of the tube due to a small bend radius, but the cross-sectional area still remains much greater than the cross-sectional area of the orifice 68. Thus, the U-bend 36 does not restrict the flow of fluid through the U-tube 32. In alternate embodiments, the U-tubes 32 could be constructed with a separate fitting to form the U-bend 36. As used in the present application, the term U-joint will be understood to include bends in tubing as well as separate fittings to form the U.

The orifices 68 perform two basic functions. First, the orifices 68 balance or equalize the flow of fluid in each of the U-tubes 32. The supply tube 22 receives fluid under pressure from the external fluid source and the orifices 68 control or meter the flow of fluid into each U-tube 32 so that each U-tube will receive approximately the same volume of fluid flow at a preselected fluid flow volume. The fluid flow volume is chosen so that the fluid will remain in the U-tubes for a sufficiently long time to absorb the desired quantity of heat and the fluid flow is controlled to flow at a relatively low level within the U-tubes 32 so that when the fluid reaches the highest position in the U-bends 36, the fluid will gravity flow down the return sides 38 of the U-tubes 32, trickling down the side of those tubes. As the fluid trickles down the return sides 38, it absorbs heat and also allows a venting function to be performed by the return sides 38 of the U-tubes 32 as previously described.

The surface area of the U-tubes 32 should be sized to efficiently and adequately absorb heat that is transmitted into the interior of solar receiver tube 12. It has been found that the surface area of the U-tubes 32 may be sized with reference to the interior surface area of the evacuated tubes 12. In the embodiment described, the inside diameter of the interior tube (which is the absorber tube) 61 of solar receiver tube 12 is about one and one-half (1.50") inches and the ratio of the U-tube 32 surface area to the interior surface area of the interior tube 61 of solar receiver tube 12 is about two-thirds ($\frac{2}{3}$). For most applications this ratio ($\frac{2}{3}$) has been found to be optimum. A higher ratio is generally not required and is not cost effective. A minimum ratio for adequate heat transfer is about one-third ($\frac{1}{3}$).

Figure 5:
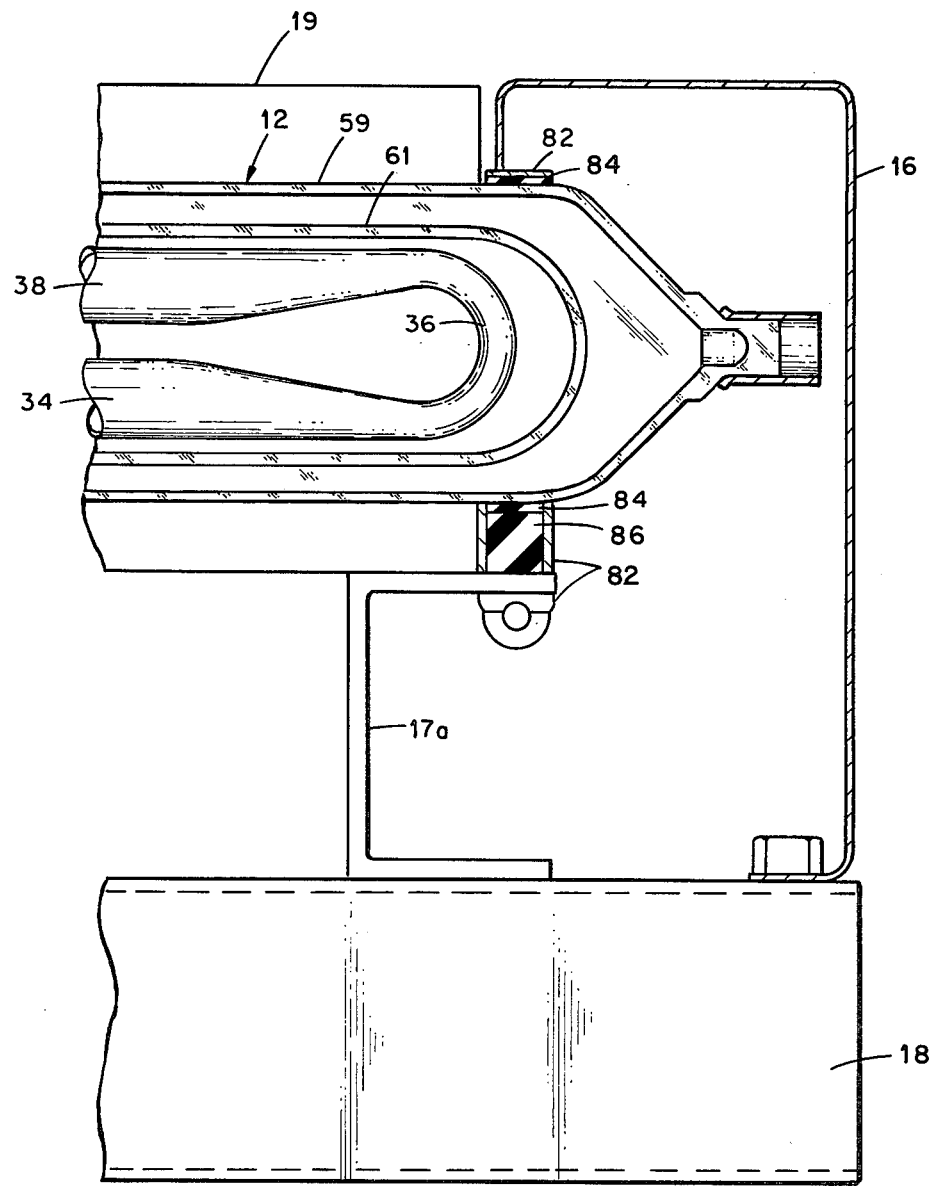
FIG. 5 is a cross-sectional view of the sealed end of the evacuated solar receiver tube showing the end of the riser U-tube therein disposed.

In FIG. 5, there is shown a cross-sectional view of the sealed end of a evacuated solar receiver tube 12 which is mounted on a lateral rail 17a. A plurality of clamps 82 are dimensioned to receive the tubes 12 and secure them to the lateral rail 17a, and a rubber mounting ring 84 encompasses the tubes 12 within the clamps 82. Also, the tubes 12 are mounted on rubber mounting bases 86 which are dimensioned to fit within the clamps 82. The lateral rail 17a is mounted on a pair of longitudinal rails 18 one of which is shown in FIG. 5. Lateral rails 17b, 17c and 17d also serve as the mounting surface for the reflector elements 19.

FIG. 6 discloses an exploded view of the manifold housing 40 shown with the cover 42 removed from the housing 40. By reference to FIGS. 6 and 4, it will be appreciated that the cover 42 is dimensioned to overlap the upper portion of the housing 40 and is secured thereto by screws 44. Apertures 90 and 92 are formed at the end covers of the housing 40 for snugly receiving the manifold return tube 20 and the manifold supply tube 22, respectively. Apertures 54 are formed in one longitudinal side of manifold housing 40 to receive the solar vacuum receiver tubes 12 and U-tubes 32.

In FIG. 7 there is shown a cross-sectional view of the U-tube 32, the evacuated receiver tube 12 and the reflector 19. The reflector 19 is mounted on the lateral rails 17 and is configured to reflect solar energy onto the receiver tube 12 which is positioned optically favorably, adjacent to the reflector 19. In the preferred embodiment, the U-tube 32 is disposed within evacuated receiver tube 12 with its return side 38 positioned directly over the supply side 34 so that both sides 34 and 38 are in a vertical plane.

Although a particular embodiment has been described in the foregoing description, it will be appreciated that the present invention is capable of numerous rearrangements, modifications and substitutions of parts without departing from the scope of the invention. The above description is not intended to limit the scope of the invention.

What is claimed is:

1. An apparatus for collecting solar energy and for heating a fluid supplied for an external fluid source for use in an external device comprising:
   a manifold disposed at the lower end of the apparatus;
   a manifold supply tube forming a part of the manifold and being operable to receive fluid for the apparatus from the external fluid source;
   a manifold return tube forming a part of the manifold and being operable to return fluid from the apparatus for use in the external device;
   at least one riser U-tube extending away from said manifold in an upwardly inclined direction, said riser U-tube having a supply end, a supply side extending from said supply end, a U-joint in said U-tube disposed distally from said supply end, a return side extending from said U-joint toward said manifold, and a return end on said return side disposed distally from said U-joint, said apparatus being positioned to dispose said U-joint above said supply end and above said return end of said riser U-tube, said supply end of said riser U-tube being in fluid communication with said manifold supply tube, said return end being in fluid communication with said manifold return tube;
   at least one metering orifice associated with said U-tube and having a reduced area with respect to the cross-sectional area of said U-tube, said orifice being disposed to meter the flow of fluid in the supply side of said U-tube;
   said return side and return end of the U-tube and said manifold return tube being of a sufficiently large diameter, having a greater cross-sectional area than said orifice, and being inclined so that fluid will fill said supply side of said U-tube and fluid will gravity flow through said return side of said U-tube and through the manifold return tube and so that a vent space will be formed in the return side of said U-tube;
   a return orifice in said manifold return tube having an area substantially greater than said metering orifice for receiving fluid into said manifold return tube from said return end of said U-tube; and
   means for isolating said U-tube from surrounding air.

2. The apparatus of claim 1 wherein said orifice comprises an aperture formed in said manifold supply tube adjacent said supply end of said riser U-tube so that fluid may flow from said manifold supply tube through said orifice and into said supply end of said riser U-tube.

3. The apparatus of claim 2 further comprising at least one dimple formed in and protruding into said manifold supply tube; said dimple having said orifice formed in the approximate center of said dimple and having a diameter at least as great as the diameter of said supply end of said supply tube whereby said supply end is dimensioned to be received by said dimple for being attached thereto.

4. The apparatus of claim 3 wherein said manifold supply tube and said U-tube are constructed of metal and said U-tube is metallurgically bonded to said supply tube with said supply end disposed in said dimple.

5. The apparatus of claim 3 wherein said U-tube is constructed of glass.

6. The apparatus of claim 3 wherein said U-tube is constructed of plastic.

7. The apparatus of claim 3 further comprising:
   fluid containment means detachably, sealably, attached to one end of said supply tube and being removable from said supply tube to provide access to the interior of said supply tube; and
   cleaning access means formed in said manifold for providing access to said fluid containment means and said supply tube for a cleaning operation.

8. The apparatus of claim 2 further comprising fluid containment means detachably, sealably, attached to one end of said supply tube and being removable from said supply tube to provide access to the interior of said supply tube.

9. The apparatus of claim 8 wherein said fluid containment means is a hose for being connected to another apparatus for collecting solar energy.

10. The apparatus of claim 8 wherein said fluid containment means is a cap.

11. The apparatus of claim 1 wherein said means for isolating comprises a transparent tube encompassing said riser U-tube.

12. The apparatus of claim 1 wherein said means for isolating comprises at least an absorber tube encompassing said riser U-tube.

13. The apparatus of claim 12 wherein said riser U-tube is dimensioned to have an outside surface area of at least about one-third of the interior surface area of said absorber tube.

14. The apparatus of claim 12 wherein said riser U-tube is dimensioned to have an outside surface area of about two-thirds of the interior surface area of said absorber tube.

15. The apparatus of claim 12 further comprising a reflector disposed to reflect solar energy onto said absorber tube.

16. The apparatus of claim 1 wherein said U-joint in said riser U-tube comprises a bend in said riser U-tube.

17. An apparatus for collecting solar energy and heating fluid supplied from an external fluid source for use in an external device comprising:

an elongate manifold extending along the lower edge of said apparatus having a length, lateral sides and ends, said manifold having an elongate manifold housing;

insulation substantially covering the interior of said manifold housing and forming an elongate cavity in the approximate center of and extending for substantially the length of said manifold;

a manifold supply tube disposed in said cavity and extending along the length of said manifold for receiving fluid for said apparatus from said external fluid source;

a manifold return tube disposed in said cavity and extending along the length of said manifold for returning fluid from the apparatus for transmission to said external device;

end apertures formed in the ends of said manifold housing dimensioned to snugly receive said manifold supply tube and said manifold return tube;

a fluid containment means detachably and reattachably mountable on at least one end of said manifold supply tube for providing access to the interior of said manifold supply tube;

a plurality of dimples formed at spaced intervals along and being depressed into said manifold supply tube, each of said dimples having an apex;

an orifice formed in, and near the apex of, each of said dimples;

a plurality of elongate riser U-tubes, each riser U-tube having a supply end, a riser supply side of said U-tube extending from said supply end, a U-bend in said return side disposed distally from said supply end, a return side extending from said U-bend, and a return end on said return side disposed distally from said U-bend, said supply end being dimensioned to mate with and being sealingly attached to said dimple, the cross-sectional area of said supply side and said return side of said U-tube being substantially greater than the area of said orifice, said riser U-tubes being inclined upwardly when disposed for operation so that said U-bend is elevated with respect to said supply end and said return end;

a plurality of return apertures formed at spaced intervals along said manifold return tube and being dimensioned to receive said return end of said U-tubes, said return end of each of said U-tubes being inserted into one of said return apertures and sealingly attached thereto;

a plurality of manifold housing apertures formed at spaced intervals along a side of said manifold housing with one of said U-tubes extending through each of said manifold housing apertures; and a plurality of elongated, double-wall, cylindrical evacuated solar energy receiver tubes, each having a hollow core dimensioned to fit over said U-tubes and being sealed separately at one end and together at the opposite end, with a hollow core end resiliently attached to said manifold aligned with and extending from one of said manifold apertures.

* * * * *